(12) United States Patent
Pettersson (10) Patent No.: US 9,603,300 B2
(45) Date of Patent: Mar. 28, 2017

(54) AUTONOMOUS GARDENING VEHICLE WITH CAMERA

(71) Applicant: HEXAGON TECHNOLOGY CENTER GMBH, Heerbrugg (CH)

(72) Inventor: Bo Pettersson, London (GB)

(73) Assignee: HEXAGON TECHNOLOGY CENTER GMBH, Heerbrugg (CH)

(*) Notice: Subject to any disclaimer, the term of this patent is extended or adjusted under 35 U.S.C. 154(b) by 23 days.

(21) Appl. No.: 14/563,815

(22) Filed: Dec. 8, 2014

(65) Prior Publication Data

US 2015/0163993 A1 Jun. 18, 2015

(30) Foreign Application Priority Data

Dec. 12, 2013 (EP) .................................... 13196892

(51) Int. Cl.
*A01D 34/00* (2006.01)
*G05D 1/02* (2006.01)

(52) U.S. Cl.
CPC .......... *A01D 34/008* (2013.01); *G05D 1/0246* (2013.01); *G05D 1/0251* (2013.01); *G05D 2201/0208* (2013.01)

(58) Field of Classification Search
CPC .. A01D 34/008; G05D 1/0246; G05D 1/0251; G05D 2201/0208

(Continued)

(56) References Cited

U.S. PATENT DOCUMENTS 6,832,000 B2 * 12/2004 Herman .................. G06T 5/001
382/164
7,015,831 B2 * 3/2006 Karlsson ................ G01C 21/12
318/568.11

(Continued)

FOREIGN PATENT DOCUMENTS

CN 102771246 A 11/2012
EP 2 620 050 A1 7/2013

(Continued)

OTHER PUBLICATIONS

Yang et al., "Vision-Based Localization and Mapping for an Autonomous Mower", International Conference on Intelligent Robots and Systems, Nov. 3, 2013, pp. 3655-3662.

(Continued)

*Primary Examiner* — Fadey Jabr
*Assistant Examiner* — Angelina Shudy
(74) *Attorney, Agent, or Firm* — Maschoff Brennan (57) ABSTRACT

Some embodiments described herein include a method for generating scaled terrain information with an unmanned autonomous gardening vehicle. In some embodiments the gardening vehicle includes a driving unit comprising a set of at least one drive wheel and a motor connected to the at least one drive wheel for providing movability of the gardening vehicle, a gardening-tool and a camera for capturing images of a terrain, the camera being positioned and aligned in known manner relative to the gardening vehicle. In context of the method the gardening vehicle is moved in the terrain while concurrently generating a set of image data by capturing an image series of terrain sections so that at least two (successive) images of the image series cover an amount of identical points in the terrain, wherein the terrain sections are defined by a viewing area of the camera at respective positions of the camera while moving.

19 Claims, 4 Drawing Sheets

(58) Field of Classification Search
USPC .................................................. 701/28, 23
See application file for complete search history.

(56) References Cited

U.S. PATENT DOCUMENTS

| | | | | |
|---|---|---|---|---|
| 7,542,624 B1* | 6/2009 | Koch | ................ | G06K 9/00214 382/106 |
| 8,396,592 B2* | 3/2013 | Jones | .................... | A47L 11/00 318/568.12 |
| 8,788,092 B2* | 7/2014 | Casey | ................ | G05D 1/0238 700/245 |
| 8,958,939 B2* | 2/2015 | Einecke | ............... | A01D 34/008 37/243 |
| 9,443,344 B2* | 9/2016 | Chatry | ...................... | G06T 1/60 |
| 9,466,143 B1* | 10/2016 | Walvoord | ............... | G06T 15/00 |
| 2004/0039498 A1* | 2/2004 | Ollis | ...................... | G05D 1/024 701/23 |
| 2006/0012493 A1* | 1/2006 | Karlsson | ................ | G01C 21/12 340/995.24 |
| 2006/0151680 A1* | 7/2006 | Franzen | ............... | A01D 34/006 250/205 |
| 2011/0164810 A1* | 7/2011 | Zang | ...................... | G06T 17/00 382/154 |
| 2011/0295636 A1* | 12/2011 | Anderson | ........ | G06Q 10/06311 705/7.13 |
| 2012/0182392 A1* | 7/2012 | Kearns | .................. | B25J 11/009 348/46 |
| 2012/0226437 A1* | 9/2012 | Li | ...................... | G01C 21/3647 701/423 |
| 2013/0190965 A1* | 7/2013 | Einecke | ............... | A01D 34/008 701/28 |
| 2013/0271579 A1* | 10/2013 | Wang | .................. | G01B 11/002 348/47 |
| 2014/0037136 A1* | 2/2014 | Ramalingam | ......... | G06T 7/0042 382/103 |
| 2015/0120057 A1* | 4/2015 | Wong | .................... | G05D 1/024 700/259 |
| 2015/0170390 A1* | 6/2015 | Conomis | ................. | G01S 11/12 382/284 |
| 2015/0197007 A1* | 7/2015 | Pack | .................... | G05D 1/0038 701/2 |
| 2015/0201555 A1* | 7/2015 | Willgert | ............... | G05D 1/0246 701/26 |
| 2015/0206023 A1* | 7/2015 | Kochi | .................... | G01B 11/00 382/199 |
| 2015/0219767 A1* | 8/2015 | Humphreys | ........... | G01S 19/43 342/357.26 |
| 2015/0347872 A1* | 12/2015 | Taylor | ................... | G06T 7/0075 382/224 |
| 2016/0157938 A1* | 6/2016 | Breisacher | .......... | G06F 19/3437 703/11 |
| 2016/0187130 A1* | 6/2016 | Metzler | .................... | G01C 1/04 382/109 |
| 2016/0309134 A1* | 10/2016 | Venkataraman | ... | H04N 13/0022 |
| 2016/0312446 A1* | 10/2016 | Pettersson | ............... | E02F 9/261 |

FOREIGN PATENT DOCUMENTS

| | | |
|---|---|---|
| WO | 2004/059900 A2 | 7/2004 |
| WO | 2007/051972 A1 | 5/2007 |

OTHER PUBLICATIONS

European Search Report dated May 14, 2014 as received in Application No. EP 13 19 6892.

* cited by examiner

AUTONOMOUS GARDENING VEHICLE WITH CAMERA

FIELD

The present invention generally pertains to an unmanned autonomous gardening vehicle comprising a camera and to a method for generating terrain information with help of that gardening vehicle while moving.

BACKGROUND

Common autonomous gardening vehicles like lawnmowers typically comprise an amount of sensors for providing detection of environmental data, which allow controlling the vehicle so that possible obstacles in the terrain are recognised and avoided. Moreover, an autonomous lawnmower typically moves according to a random path over the terrain to be mown, wherein a defined area of the terrain is mown in a given time period. That time period is comparatively lengthy as the mower moves several times (random like) over identical terrain sections, whereby other parts of the terrain are reached for the first time very later on.

Additionally, a mower using a mapping functionality for gathering positional information of the terrain is known from WO 2007/051972. The positional information is derived on basis of images of the terrain captured by a camera which is mounted on the mower.

Furthermore, existing gardening vehicle or lawnmowers are designed mainly for cutting of plants or mowing of grass in the terrain or the like independent from particular conditions of the respective terrain, particularly independently from if ground or a plant is dried out or if a terrain section comprises high humidity and thus plant growth is impossible or aggravated. Thus, respective terrain sections are treated by the gardening vehicle, wherein the bad terrain conditions are maintained and no improvement with view to plant growth is provided. I.e. a lawnmower for instance is driven over such terrain sections on each mowing cycle irrespectively of the terrain conditions or without taking further actions in order to provide terrain improvement.

Moreover, according to autonomous lawnmower but also for alternative gardening vehicles known from prior art, working areas of such mowers or vehicles are defined by kind of wires which are embedded in the ground. The mower or vehicle comprises a wire detection unit for detecting approaching or reaching a respective terrain section with the wire (under which the wire is installed), wherein specified controlling commands enable to direct the lawnmower in a direction as to no more approaching the wire or to move away from the wire. For providing such a limitation of movement of the mower the wire has initially to be buried belowground in defined depth. Therefore, preparation of the terrain for a respective autonomous lawnmower is quite time consuming and related to environmental intrusions.

SUMMARY

Some embodiments provide an improved autonomous gardening vehicle for autonomously treating a designated terrain, wherein the gardening vehicle is moved in a way that the terrain is treated more efficiently, in particular wherein each terrain section is driven over basically one time only.

Some embodiments provide an improved gardening vehicle which is enabled to derive terrain information while applying a gardening process in order to provide precise orientation and localisation in the terrain.

Some embodiments provide information about terrain conditions correlated with relative position information of respective terrain sections. Particularly, terrain information is associated with absolute position information and/or provided to an operator of the autonomous gardening vehicle.

Some embodiments provide respective navigation functionality for such a gardening vehicle in order to enable a controlled movement of the mower inside a defined area.

Some embodiments provide the use of an autonomous gardening vehicle without above mentioned environmental intrusions, particular providing an autonomous control of the gardening vehicle without a buried wire. That object also refers to controlling and navigating the gardening vehicle by use of aboveground terrain information.

Some embodiments provide an unmanned autonomous lawnmower for autonomously treating a designated terrain more efficiently by providing further terrain information.

Some embodiments relate to a method for generating scaled terrain information with an unmanned autonomous gardening vehicle. The gardening vehicle comprises a driving unit with a set of at least one drive wheel and a motor connected to the at least one drive wheel for providing movability of the gardening vehicle, a gardening-tool and a camera for capturing images of a terrain, the camera being positioned and aligned in known manner relative to the gardening vehicle. According to specific embodiments the camera is arranged pivotable around at least one axis. The method according to the invention comprises:

moving the gardening vehicle in the terrain whilst concurrently generating a set of image data by capturing an image series of terrain sections so that at least two images, particularly successive images, of the image series cover an amount of identical points in the terrain, wherein the terrain sections are defined by a viewing area of the camera at respective positions of the camera while moving, applying a simultaneous localisation and mapping (SLAM) algorithm to the set of image data and thereby deriving terrain data, the terrain data comprising
a point cloud representing the captured terrain and
position data relating to a relative position of the gardening vehicle in the terrain, particularly a relative position of the gardening vehicle in the point cloud, and scaling the point cloud by applying an absolute scale information to the terrain data, particularly scaling the position data.

An unmanned autonomous gardening vehicle is to be understood as any kind of ground-bound gardening vehicle capable of moving autonomously and automatically controlled (i.e. by means of a respective algorithm) inside a designated work zone.

The position data relates to the actual (relative) position of the autonomous gardening vehicle in the terrain. Each of the captured terrain sections is related to a respective position of the gardening vehicle as a pose of the camera for capturing that respective image is known and relative positions of the gardening vehicle are derivable from the image series. With other words, the terrain data may comprise position information regarding the position of the gardening vehicle and positions of the captured terrain sections.

Scaling of the position data particularly is to be understood as defining a respective position in a coordinate system, i.e. deriving true coordinates (x, y and z) according to the position.

Moreover the position data particularly relates to the orientation of the gardening vehicle in the terrain and thus may provide 6DoF (six degrees of freedom) information referring to the gardening vehicle.

Simultaneous localisation and mapping (SLAM) is a process of concurrently building a map of an environment (terrain), particularly based on stationary features or landmarks within the environment, and using this map to obtain estimates of the location of a vehicle (the autonomous gardening vehicle in this example). The vehicle relies on its ability to extract useful navigation information from data returned by the camera mounted on the gardening vehicle.

The method of gathering terrain information starts with unknown location of the gardening vehicle and without a priori knowledge e.g. of its location in the terrain or of a landmark locations.

A vision based system is used for providing data to the SLAM algorithm to form a navigation system for the gardening vehicle. This technique, also known as visual SLAM (VSLAM), uses the passive sensing by the camera to provide a low power and dynamic localisation system. Image processing is used to locate features in the images acquired by the camera, particularly identical points of the terrain in different (successive) images.

The features are input to the SLAM algorithm which is then able to accurately compute the three-dimensional location of each feature and hence particularly to start to build a three-dimensional map as the gardening vehicle moves around the space to be gardening vehicle.

The system (gardening vehicle) that can build a map of its environment while simultaneously using that map to localise itself, promises to allow the gardening vehicle to operate autonomously in unknown environments.

The camera of the gardening vehicle may be implemented as a panoramic camera, i.e. a camera providing a field of view up to 360° around at least one axis. Such camera particularly provides a comparatively large filed of view by specific optics as by a specifically designed lens and/or comprises a kind of mirror for splitting and/or enlarging the initial field of view of the camera. Particularly the panoramic camera comprises a parabolic or cone like mirror for providing the field of view of up to 360°.

According to a specific embodiment of the invention, the unmanned autonomous gardening vehicle is implemented as an unmanned autonomous lawnmower, in particular wherein the gardening-tool is in the form of a cutting-tool. Following remarks relating to the gardening vehicle according to the invention also are to be understood as to be transferable onto such unmanned autonomous lawnmower and vice versa (remarks relating to the autonomous lawnmower are transferable onto the gardening vehicle).

According to a specific embodiment of the invention, the absolute scale information is derived by receiving movement data from a sensor unit of the gardening vehicle providing information about a distance covered by moving the gardening vehicle. The sensor unit is designed as a sensor for detecting revolutions of a wheel of the gardening vehicle, particularly the at least one drive wheel, and/or as a distance measuring unit, particularly DISTO-module, for measuring distances to an object by emitting laser light and receiving the laser light reflected at the object and/or as a range camera, particularly RIM camera, and/or as an inertial measuring unit (IMU).

According to a further specific embodiment of the invention the absolute scale information is derived by capturing a reference image of a reference body of known appearance and/or position in the terrain and deriving the absolute scale information by image processing based on the appearance of the reference body in the captured reference image and particularly of a known magnification ratio of the camera. Here, particularly, the dimensions, spatial orientation and/or shape of the reference body are pre-known.

From relative observations of landmarks (reference bodies), according to the inventive method simultaneously computation of an estimate of vehicle location and an estimate of landmark locations is provided. While continuing in motion, the vehicle builds a complete map of landmarks and uses these to provide continuous estimates of the vehicle location. By tracking the relative position between the vehicle and identifiable features in the environment, both the position of the vehicle and the position of the features can be estimated simultaneously. In the absence of external information about the vehicle's position, this algorithm presents an autonomous system with the tools necessary to navigate in unknown environments.

Concerning the handling of data produced by the gardening vehicle—according to the invention—the set of image data and/or the terrain data may be transmitted to a database and stored in it, wherein the gardening vehicle comprises a storing unit comprising the database. Furthermore, a remote controlling unit for controlling the gardening vehicle comprises the storing unit comprising the database, and/or the database is embodied by a data cloud, particularly stored on a remote server, particularly wherein the terrain data is derived from the image data by cloud computing based on the simultaneous localisation and mapping algorithm and/or the scaling of the point cloud is performed by cloud computing.

Now referring to the definition of an area inside which the gardening vehicle is designated to move and work. In that context, according to the invention, a borderline of a respective working area is defined for the gardening vehicle, within which the gardening vehicle is controllable to autonomously move and work, by teaching or by setting the borderline on basis of a terrain map.

Teaching the borderline is provided by moving the gardening vehicle along a desired path, capturing a series of border-images of terrain corresponding to the path and of defined vicinity relative to the path, the series of border-images represents the image series, and providing the series of border-images for controlling the gardening vehicle. When setting the borderline on basis of a terrain map, border-position data is provided for controlling the gardening vehicle.

In particular—in case the borderline is defined by teaching—continuous comparing of the border-images of the series of border-images with actual images by image processing is performed, the actual images being captured while moving the gardening vehicle inside the working area, a rate of matching for every actual image is derived based on the comparison and the movement of the gardening vehicle is controlled based on the rate of matching so that the gardening vehicle automatically moves only inside the working area. A movement-controlling command may be provided for adapting the movement direction of the gardening vehicle if the rate of matching exceeds a predetermined matching-threshold.

According to a specific embodiment of the invention, at least one state parameter is extracted from the set of image data and/or from the terrain data which represents an actual state of at least one designated terrain section, the state particularly relating to a state of at least one plant and/or of ground, the state parameter is compared to a predetermined threshold for the respective state and gardener information is derived based on the comparison of the predetermined threshold and the state parameter.

The state parameter particularly provides at least one terrain factor of a group of terrain factors, the group of terrain factors comprises at least the following factors:
- plant height, particularly grass length,
- plant growth, particularly of bush or hedge,
- humidity of the terrain,
- density of plants,
- planarity of the terrain and
- brightness or colour of the terrain.

According to a more specific embodiment regarding the gardener information, the gardener information is provided to a user of the gardening vehicle, particularly together with a related recommendation concerning a suggested treatment of the respective at least one designated terrain section, and/or the gardening-tool is applied based on the gardener information, the gardening-tool particularly being designed as cutting-tool, particularly hedge-cutter, tree-branch cutter, grass-cutter or scissors, as fertilising unit, as pesticide unit, as watering unit or as lawn thatcher.

According to a further embodiment of the invention, the gardening-tool is applied (by controlled guiding of the tool) based on the terrain data, in particular based on the point cloud, wherein
- the terrain data represents at least an actual shape of an object in the captured terrain,
- gardening data is provided representing a target shape for the object and
- the gardening-tool is guided based on the gardening data so that the actual shape of the object is transferred into the target shape.

In particular, the gardening vehicle is positioned at a designated position in the terrain based on the terrain data and the gardening-tool is guided according to a designated shape of a plant based on the terrain data and the gardening data.

Such functionality provides individual and automatic (i.e. autonomously controlled) shaping of bushes, hedges or trees etc. in the terrain. Particularly, the gardening data is provided as digital data (e.g. CAD-data) representing at least one designated shape and size of an object to be sculpted.

According to a further embodiment of the invention controlling information is provided for controlling a further gardening unit in the terrain, wherein the controlling information is derived by the terrain data and an actual position and/or orientation of the further gardening unit in the terrain, wherein the position and/or orientation of the gardening unit is derived directly from the terrain data by data processing (if the gardening unit was located in the terrain when capturing images for generating the terrain data) or is derived by image processing of an image covering at least a part of the gardening unit and particularly a part of the terrain, in particular wherein the gardening unit comprises a 6DoF-target (6 Degrees of Freedom) providing the determination of the orientation of the gardening unit with six degrees of freedom e.g. by image processing of an image covering the 6DoF-target.

By that, a kind of image-based tracking of the further gardening unit may be provided by means of the gardening vehicle. Such tracking may be based on tracking methods known in context of laser tracking systems.

Above aspect of the invention provides controlling of additional gardening units in the terrain based on the terrain information provided by means of captured imaged by the autonomous gardening vehicle. As mentioned a position and/or an orientation of such additional unit can be derived from the terrain data (the terrain data comprising image data of the gardening unit). Alternatively, additional image data is processed from additional images covering at least a part of the unit and of the terrain, wherein a relative position and/or orientation of the unit according to the additional image data is referenced to the terrain data, e.g. by processing of respectively generated point clouds and/or images.

Moreover, the controlling information may be provided to an operator of the further gardening unit comprising instructions concerning (manual or controlled autonomous) guidance of the gardening unit relatively to the terrain, particularly in order to achieve a designated sculpture of a respective plant to be treated by the further gardening unit.

The gardening vehicle or lawnmower according to the invention furthermore may provide determination of its actual position. For that, the position of the gardening vehicle is determined on basis of at least one captured locating image by comparing derived locating image data of the at least one captured locating image to pre-known image data.

Particularly, the position of the gardening vehicle is determined wherein a set of defined characteristics, particularly a set of individual values defining respective magnitudes of the characteristics, is derived from the locating image data and is compared to sets of reference characteristics, particularly to related reference values of the characteristics, the sets of reference characteristics being related to the pre-known image data, and the position of the gardening vehicle in the terrain is derived by that comparison due to each set of reference characteristics being associated to defined positions in the terrain.

According to a preferred embodiment of the invention, a digital terrain map, particularly a digital terrain model, based on the point cloud, particularly based on the terrain data, is created.

The invention also related to an unmanned autonomous gardening vehicle comprising a driving unit with a set of at least one drive wheel and a motor connected to the at least one drive wheel for providing movability of the gardening vehicle, a gardening-tool, a camera for capturing images of a terrain, the camera being positioned and aligned in known manner relative to the gardening vehicle, and a controlling unit for controlling the gardening vehicle.

Furthermore, the gardening vehicle provides a functionality adapted to generate scaled terrain information by executing, respectively controlling, following steps:
- moving the gardening vehicle in the terrain whilst concurrently generating a set of image data by capturing an image series of terrain sections so that at least two images, particularly successive images, of the image series cover an amount of identical points in the terrain, wherein the terrain sections are defined by a viewing area of the camera at respective positions of the camera while moving,
- applying a simultaneous localisation and mapping (SLAM) algorithm to the set of image data and thereby deriving terrain data, the terrain data comprising
  - a point cloud representing the captured terrain and
  - position data relating to a relative position of the gardening vehicle in the terrain, particularly a relative position of the gardening vehicle in the point cloud, and
- scaling the point cloud by applying an absolute scale information to the terrain data, particularly scaling the position data.

According to an embodiment of the invention, the unmanned autonomous gardening vehicle is implemented as an unmanned autonomous lawnmower, particularly wherein the gardening-tool is implemented as a cutting-tool.

Particularly, the unmanned autonomous gardening vehicle is designed so that a method as outlined above is executable by the gardening vehicle, particularly wherein the gardening vehicle comprises a processing unit and the execution of the method being provided by the controlling and processing units.

According to an embodiment of the invention, the unmanned autonomous gardening vehicle comprises a counting sensor counting the number of revolutions of a wheel of the gardening vehicle, particularly of the at least one drive wheel, the counting sensor providing the absolute scale information and/or a distance measuring unit, particularly DISTO-module, for measuring distances to an object by emitting laser light and receiving the laser light reflected at the object and/or a range camera, particularly RIM camera, and/or swivelling means for swivelling the camera so that the camera is alignable in a desired direction for capturing the terrain sections or a reference body which provides the absolute scale information.

Moreover the invention relates to a computer program product having computer-executable instructions for controlling and executing an above method, in particular when run on a controlling unit, and particularly on a processing unit, of an unmanned autonomous gardening vehicle according to the description above.

According to a specific embodiment of the invention, the movement of the gardening vehicle is controlled depending on a measured torque which applies at at least one wheel of the gardening vehicle or at the cutting tool.

BRIEF DESCRIPTION OF THE DRAWINGS

The method and the device according to the invention are described or explained in more detail below, purely by way of example, with reference to working examples shown schematically in the drawings. Specifically.

DETAILED DESCRIPTION

Figure 1:
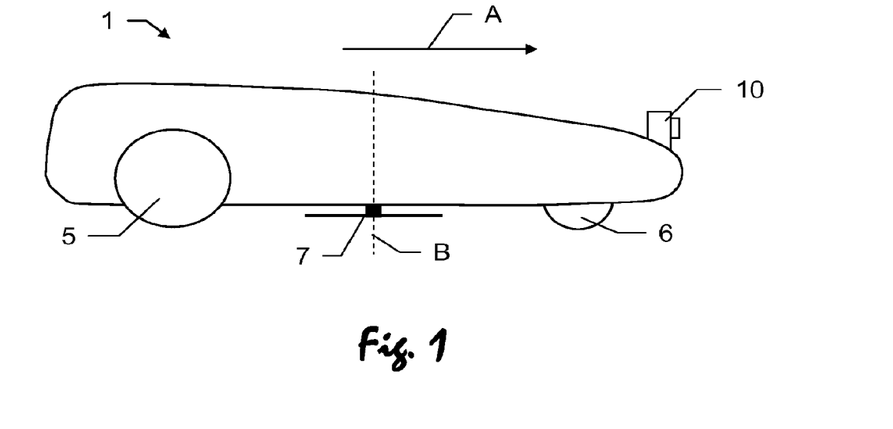
FIG. 1 shows a gardening vehicle (here: unmanned autonomous lawnmower) according to the invention comprising a set of two drive wheels, a guiding wheel, a mower tool and a camera.

FIG. 1 shows an unmanned autonomous gardening vehicle according to the invention being implemented as an unmanned autonomous lawnmower 1 comprising a set of two drive wheels 5, a guiding wheel 6, a mower tool 7 and a camera 10. The drive wheels 5 are arranged at opposite sides (left and right) at the back of the lawnmower 1 concerning a driving direction according to the shown arrow A. The drive wheels 5 are driven in separate manner as to provide directing of the lawnmower 1 according to respective rotation rates of the wheels 5. Particularly, two motors are provided—each being connected to one of the drive wheels—for controlled movement of the lawnmower as to the rotation rates of the wheels 5.

According to an alternative embodiment of the invention (not shown), at least one of the wheels 5 is driven by a motor and directing the lawnmower 1 is realised by turning the guiding wheel 6 towards a designated directions.

The mower tool 7 comprises a set of cutting blades (at least one), wherein the mower tool 7 is rotatable around an axis B and thereby cutting plants by the rotating cutting blade. The position of the mower tool 7 is variable as to its distance to the ground or the bottom side of the lawnmower 1, respectively.

Moreover, the camera 10 is attached at the front of the lawnmower 1 for capturing images of the terrain (environment) while movement of the mower 1 over ground (generating a set of image data). The camera 10 provides to capture a series of images of the terrain, wherein the rate for capturing the images (frames per second) is chosen so that two (successive) images cover an amount of identical points in the terrain, i.e. the frame rate particularly is adjustable depending on the velocity of the lawnmower 1.

As the position (and orientation) of the mower 1 is continuously changing while mowing and the position (and orientation) of the camera 10 is changing as well, each captured image covers an alternative terrain section. The captured terrain section thus is defined by the respective pose and the viewing area of the camera 10.

SLAM (simultaneous localisation and mapping) is performed based on the series of (successive) images by execution of a respective algorithm on a processing unit. The processing unit may be located at the lawnmower 1 or may be embodied as a remote unit receiving data (via wireless communication) from the lawnmower and providing processed data or control signals to the mower 1, e.g. the processing unit being integrated to a remote or field controller of the mower 1. Terrain data is produced by applying the SLAM algorithm.

In the context of executing the SLAM-algorithm, the spatial representation of the terrain's surface (=terrain data) in form of a point cloud is computed from the set of image data (captured images), e.g. a 3D model. Alternatively and—as the principle of mapping and localisation corresponds to SLAM principle—also lying in the scope of the present invention, this calculation may be done by a defined Structure-from-Motion (SfM) algorithm, wherein that algorithm may be part of a stored program with code. The SLAM- or SfM-algorithm can be based on a perspective or affine camera projection model with observation sources which compromises image pairs, image tuples and/or a video sequence and token types such as sparse feature correspondence, dense optical flow field, lines or curves, or direct SfM-techniques that do not extract any tokens from the images.

In context with the present invention, SLAM and SfM are to be considered as equivalent methods for generating terrain information.

As an example, the following algorithm is described, which compromises a step where a number of image correspondences (=identical points in the terrain) are found for at least some of the images of the set of image data. This is done using feature detection and matching algorithms such as SIFT, SURF, BRISK, BRIEF, etc. Alternatively, in case of a video sequence, the correspondences can be found using a tracking algorithm on each video frame. Tracking can be done using e.g. Kanade-Lucas-Tomasi (KLT) feature tracker or another tracking algorithm.

Using a pair of successive images the relative camera pose, i.e. position and orientation, is determined in a local coordinate frame. The algorithm uses a robust search to find a 3D translation and rotation of the camera 10 of the pair of images, e.g. the relative position and orientation of the second image with respect to the first image. With these positions the 3D position of all features seen in both images is computed using forward intersection. This gives a set of 3D points and the positions and orientations of the two initial images (frames).

In the next step, additional images (frames) are added to the existing reconstruction. Using already reconstructed 3D points, the position and orientation, which the camera 10 had during capture of an image, can be computed using resectioning. After adding a new image, the positions of 3D points are refined using all measurements in the reconstructed frames.

Particularly, as a final or intermediate step, the overall solution is refined using bundle adjustment. This part of the algorithm is a non-linear least squares minimization of the re-projection error. It will optimise the location and orientation of all camera positions and all 3D points.

If the recording contains multiple images from the same location, e.g. when the lawnmower stops moving, these images from the same location are matched. This will increase the overall accuracy.

Alternatively, other SLAM algorithms can be used to recover the positions and orientations of the camera 10. To further speed up the process, images can be transferred to a control and evaluation unit during the recording of the data.

In a further development of the method, a further improvement of the spatial representation of the terrain's surface can be achieved by computing a dense point cloud, e.g. a 3D-coordinate for each image pixel, with an algorithm such as dense matching algorithm, e.g. depth map fusion or plane sweeping.

In a next step, the point cloud and particularly the position data for the mower, particularly for each of the captured terrain sections (spatial representation of the terrain), is scaled with help of information about a known absolute reference. Advantageously, both a vertical and a horizontal orientation of the terrain data are determined using a known vertical reference.

According to specific embodiment of the invention, such scaling of the terrain data is enabled by capturing and processing of an image of a reference body of known shape and/or structure, particularly an elongated reference body, that defines e.g. a long axis due to its elongated shape and comprises at least two defined visually detectable markings, whereby at least two points are defined on the reference body. The reference body may be designed as for example a scale bar or a bar with two or more optical markers in a defined distance to each other.

An absolute distance in between the at least two points, particularly also the spatial relationship of the at least two points with respect to the long axis of the body, are known. This reference body is placed on or next to the terrain to be mown. The reference body is imaged with help of the camera 10 on at least some images together with or additionally to the captured terrain images. At least two spatial positions relative to the terrain are determined for the at least two points for instance also based on the SLAM-evaluation. Then, the point cloud is scaled based on a measured distance in between the determined at least two spatial positions and the known absolute distance in between the at least two points of the reference body.

Such a reference body can also be formed by defined points or objects in the terrain with known distance, detectable in an image. This known distance can be derived by a measurement with a measurement device such as a distance meter (electronic distance meter, EDM), which can be integrated in the lawnmower e.g. in form of a DISTO module (compare FIG. 2). Such a visually detectable point can be defined by an edge or a spot with a different property compared to the surrounding. A visually detectable point can further comprise an optical marking such as a colour spot or a geometric shape like a circle. As an example, a reference body can thus be formed by an object of known dimensions, such as the height or width of the object or of a part of it.

According to another specific embodiment of the invention, the absolute scale information is derived by measuring the propagation of the lawnmower 1 while generating the set of image data, i.e. while moving.

For that purpose, the lawnmower 1 comprises a measuring unit for detecting the rotation or state of rotation of at least one wheel 5, 6 of the mower 1, in particular of the at least one drive wheel 5. Such a unit may be embodied as a counting sensor which counts the number of rotations of the wheel 5, 6 or may be built as an angle detection unit for continuously determining an angular position of the wheel 5, 6 relative to the lawnmower 1. Such a unit may specifically be designed as angle encoder. Moreover, the dimensions of the respective wheel 5, 6 are known (e.g. diameter, radius or perimeter) and thus a moving distance of the lawnmower 1 is enabled to be derived based on the detection of the wheel rotation and the dimensions of the wheel 5, 6. With other words, an absolute measure of a positional change of the lawnmower 1 in the terrain is provided.

The images captured by the camera or respective terrain sections are associated to the correspondingly measured moving distances. By that, the terrain data (point cloud), which is based on the captured images, is scaleable by comparing measured distances to the derived point cloud and/or to the position data relating to positions of the lawnmower. In a further step, a scaled map of the terrain is processable.

Therefore, according to each of the alternatives for providing the absolute scale, an efficient method for gathering scaled terrain information and simultaneously generating a map of the terrain is given. Thus, the lawnmower 1 can be places in unknown terrain, wherein by execution of the SLAM based on images, which are captured while moving the mower 1 in the terrain, a navigation of the mower 1 is enabled.

Figure 2:
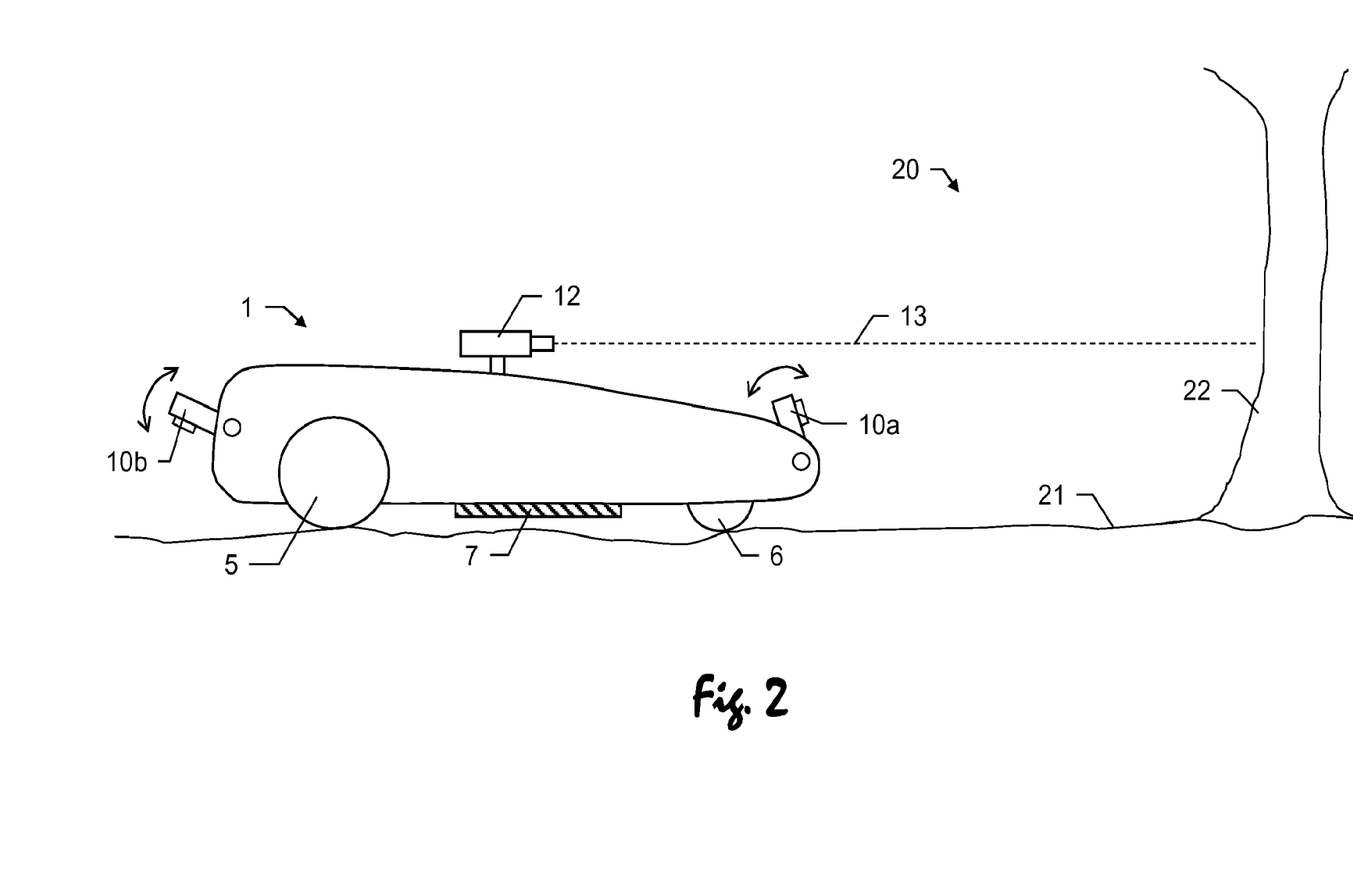
FIG. 2 shows a further embodiment of a lawnmower according to the present invention.

FIG. 2 shows a further embodiment according to the present invention. The lawnmower 1 (which represents a gardening vehicle according to the invention) again comprises a set of drive wheels 5, a guiding wheel 6 and a cutting tool 7. Moreover, two cameras 10a, 10b are attached at the mower 1 for capturing images of the terrain 20, i.e. particularly of the ground 21 and e.g. of bushes and/or trees 22. The cameras 10a and 10b are designed to be attached swivelable (i.e. pivotable; compare arrows) relative to the mower 1. That design of camera attachment allows to align a camera 10a, 10b so that a part of the terrain is capturable which is best suited for precisely deriving terrain information by SLAM.

At least one of the cameras 10a, 10b may be a video camera providing images with a variable video frame rate. An image tracking particular for defining identical points in different images may be realised by help of such video sequence.

Additionally, the lawnmower 1 comprises an electronic distance measuring unit 12 for determining a distance to an object, e.g. to a tree 22, by emitting a laser beam 13 and receiving the reflected beam. Distances may be derived based on measuring the travel time (time of flight) of an emitted laser light pulse till receiving the respective reflected light pulse at the unit 12. Alternatively, respective distances are derived based on other known principles. Such an electronic distance meter 12 is particularly designed as laser DISTO module (as particularly offered by Leica Geosystems AG).

According to the invention, the scaling of terrain information, which is enabled to be derived by SLAM on basis of the captured images of the terrain 20 while moving the lawnmower 1, is done by associating the terrain information with distance information from the electronic distance measuring unit 12. For that, distances to a designated object in the terrain 20, e.g. to a specified (reflecting) body, to a building or to a plant, are determined with defined time interval, in particular continuously, by the electronic distance measuring unit 12. According to a specific embodiment of the invention, the determination of a distance value to the object is provided for each captured image, in particular wherein distance measuring and image capturing are synchronised. Thus, an absolute distance between two reference points of respective captured images and a scaling for the images and for a terrain map, which bases on the images, is provided. Furthermore, a derived point cloud and/or position data may be scaled by help of the measured distances.

Particularly, the electronic distance measuring unit 12 is attached to the lawnmower 1 so that the unit 12 and the laser beam 13 are swivelable about two axes. Such a design enables to keep aiming onto one designated point in the terrain while moving the mower 1 and continuously gathering position information for the mower 1 regarding that point (by distance measurements). For keep aiming onto such a fixed point, the mower 1 may comprise further sensor units which allow to determine the orientation of the mower 1 e.g. relative to a gravitation vector (e.g. inclination sensor and/or acceleration sensor) and to align the electronic distance measuring unit 12 for keep aiming the point based on the determined orientation.

Figure 3:
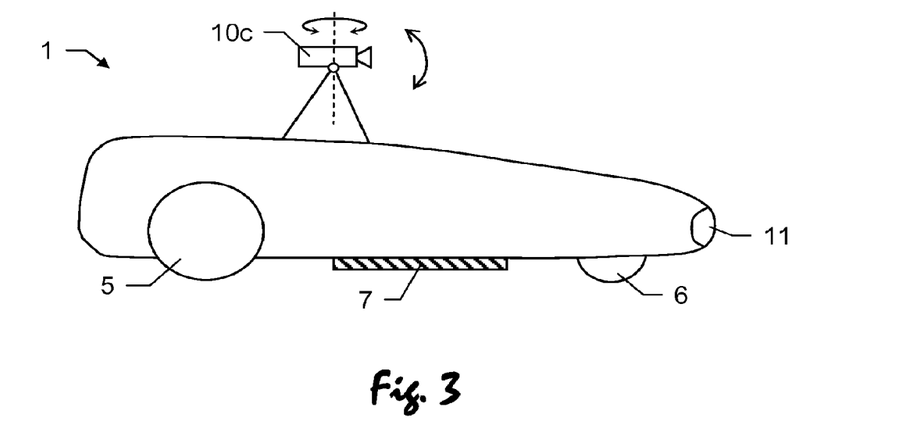
FIG. 3 shows another specific embodiment of a lawnmower according to the invention.

FIG. 3 shows another specific embodiment of an unmanned autonomous gardening vehicle according to the invention, again represented by a respective lawnmower 1, wherein the mower 1 is basically designed as already shown in FIGS. 1 and 2. As a difference to the previously described embodiments, the mower 1 comprises a camera 10c being attached to a supporting unit which provides motorised alignment of the camera 10c relative to the lawnmower 1 about two axes. Thus, the field of view of the camera 10c is alignable in any direction for aiming a designated point in the environment. Accordingly, the alignment of the camera can be adapted during movement of the mower 1 for instance in order to keep a defined object in the field of view.

Furthermore, the mower 1 comprises an observation unit 11. That unit 11 is integrated in the housing of lawnmower 11 as shown here, but may—according to alternative embodiments (not shown)—be e.g. located on top of the housing of the lawnmower 11. The observation unit 11 comprises a further camera and a distance determination functionality, in particular wherein the further camera comprises the distance determination functionality and is built e.g. as RIM-camera (range image camera). Such RIM-camera provides both image information according to a captured field of view and range information for each of a defined amount of pixels of a captured image, wherein the range information typically provides distances to respective objects (or parts thereof) in the image. The RIM-camera may be built so that a measurement of time of flight of a controlled light pulse is provided for each pixel (or a defined group of pixels) of the camera's sensor.

According to a further specific embodiment of the invention, the mower 1 only comprises the observation unit 11 with a camera but without having an additional camera 10-10c.

Similar to the scaling procedure as described with FIG. 2, a respective scaling of the terrain information here is performed by use of the rage information from the observation unit 11. Distances to an object are (continuously) determined by help of the distance determination functionality and, thus, an absolute measure of a moving distance for the lawnmower 1 is derived.

The absolute measure is linked with respective relative positions of points, which are to be defined for the captured images (e.g. automatically by a specified algorithm or by the SLAM-algorithm), and the scaling of the derived point cloud and of e.g. a created map (with position data relating to the position of the mower) is applied based on that linkage.

Moreover, range information delivered by the distance determination functionality particularly may be processed by the SLAM algorithm and provides a more precise determination of the terrain information.

Figure 4:
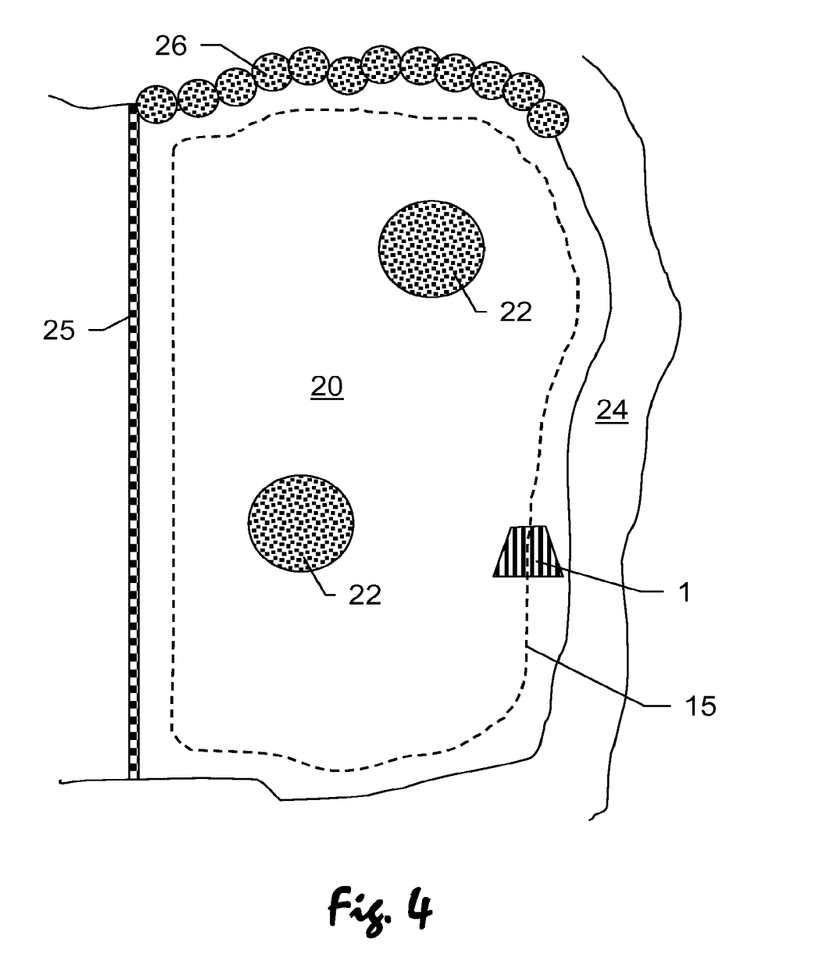
FIG. 4 shows a terrain to be autonomously mown by an unmanned lawnmower according to the invention.

FIG. 4 shows a terrain 20 to be autonomously mown by an unmanned lawnmower 1 according to the invention. The area of the terrain 20 is limited by a fence 25, a hedge 26 and a small river 24. Furthermore, the terrain 20 comprises two trees 22, which represent obstacles with respect to the work of the mower 1.

According to the invention, the lawnmower 1 comprises functionality for determining a borderline 15 for the terrain 20 to be mown, wherein that borderline 15 limits the area of movement for the mower 1. For such border determination the mower 1 is moved along the border of the terrain 20, e.g. by manually controlling the mower 1, whereby images of the border region are captured by the camera of the mower 1 and stored in a storage unit for providing reference image data representing the border region. A respective borderline 15 is derived from that data (e.g. by image processing). The borderline 15 may be represented by particular coordinates (derived by SLAM and scaling) which are associated to the image data, particularly to respectively captured images.

A controlling of the mower 1 for autonomous movement inside the terrain 1 then is based on the reference image data, wherein currently captured images are compared to reference data and based on that comparison a state of approach to the borderline 15 is determined. The mower 1 is controlled so that an approach to the borderline 15 up to a defined distance is allowed. If the mower 1 moves to close to the line 15 a controlling command is provided for steering the mower 1 in an alternative direction (e.g. in a reverse direction). Particularly the mower is stopped if it crosses the borderline 15.

Alternatively, the borderline 15 is derived while autonomous movement of the mower 1 in the terrain 20, wherein the captured images are provided to an image processing unit and terrain borders are derived based on the image processing, particularly by feature extraction based on predefined structures or pattern which represent terrain border structures (e.g. a fence). The borderline 15 as well is derived by image processing. For instance, if the mower 1 gets near the hedge 26 or the fence 25 and takes corresponding images of these structures, such images are supplied to image processing and compared to reference patterns, which schematically represent a fence and/or hedge. Additionally, a reference pattern or colour structure representing water is provided for enabling the detection of water, especially of the small river 24.

According to the invention, respective border information is linked with absolute position information derived by the SLAM algorithm and by scaling the derived terrain information. Thus, an absolute position of the borderline 15 in the terrain is known.

A further aspect of the invention relates to position referenced detection of specific or current state of at least a part of the terrain. For that, captured images are processed in order to derive a state parameter, which represents the actual state of a terrain section, the state particularly relating to a condition (i.e. health) of at least one plant and/or of the ground.

For assessing respective terrain sections with view to their state, respective state parameters for the terrain sections are to be compared to predefined reference parameters, particularly to respective thresholds for the state parameters. Based on that comparison, i.e. depending on if a parameter exceeds a threshold, respective state information concerning the terrain section may be generated.

Such state information is provided to a user of the system as gardener information. The gardener information may comprise the positions of the terrain section, a relative measure concerning the deviation of the state of the terrain section from threshold and/or an advice for the user regarding how to treat the terrain section in order to improve its current condition.

Particularly, the gardener information—as well as any other information produced by the lawnmower 1 or received by the lawnmower 1—may be transmitted to the user via a wireless communication link, e.g. via radio, Bluetooth, Wi-Fi or mobile phone communication standard (e.g. GSM). For instance, the information is received and processed by a smart phone.

According to a specific embodiment of the invention, the parameter to be checked if a respective terrain section exceeds a defined threshold, provides at least one terrain factor of a group of terrain factors, the group comprising the following factors plant height, particularly grass length,
plant growth, particularly of a bush or a hedge,
humidity of the terrain,
density of plants, e.g. of grass stalks,
planarity of the terrain and
brightness or colour of the terrain.

According to a specific embodiment of the lawnmower 1 of the invention, the mower 1 comprises additional tools for treating terrain, ground and/or plants. Such tools may be applied depending on the gardener information and/or on a command of the user. In case a respective treatment of the terrain section is to be performed, the mower is enabled—according to the mapping of the terrain—to move to the respective terrain section and to apply a designated tool. In that context, the lawnmower e.g. comprises a gardener tool, the gardener tool particularly being designed as fertilising unit, watering unit or lawn thatcher.

According to a further embodiment of the invention, the lawnmower 1 comprises functionality for detecting obstacles (here: trees 22) in the terrain 20 to be mown. Such detection is provided by image processing of images captured by the camera of the mower 1. Furthermore, a determination of a position of the respective obstacle 22 can be done by use of the SLAM algorithm and scaling of the terrain data.

According to yet another embodiment of the invention (not shown here), a docking station is provided in the terrain 20 in order to recharge the battery of the mower 1. If the charging level of the battery comes under a defined limit, the mower 1 is controlled to move to the docking station, particularly on a direct path, based on the gathered terrain data (e.g. map of the terrain). The docking station may comprise a cleaning unit which provides cleaning of the camera of the mower 1 in a docking state.

Figure 5:
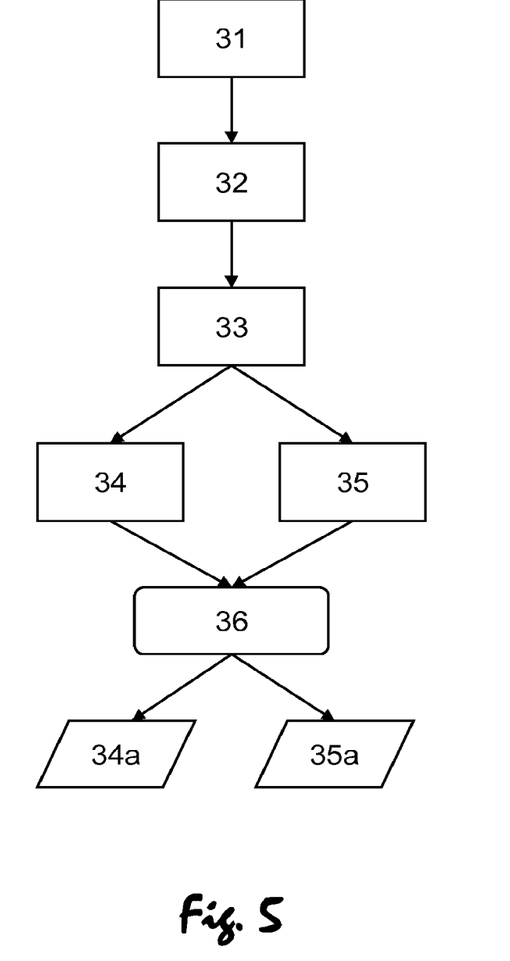
FIG. 5 illustrates a method for generating scaled terrain information with an unmanned autonomous gardening vehicle according to the invention by a flowchart.

FIG. 5 illustrates a method for generating scaled terrain information, i.e. a scaled point cloud of the terrain, with an unmanned autonomous gardening vehicle (e.g. lawnmower) according to the invention.

First, the gardening vehicle is located at an arbitrary point in unknown terrain or environment (step 31). According to a specific embodiment, the gardening vehicle may be located in an already known terrain.

For gathering the terrain information, the gardening vehicle is moving (e.g. according to a random path or according to a redefined moving strategy) in the terrain (step 32), whereby it takes images of the terrain (of respective terrain sections corresponding to the poses of the gardening vehicle and its camera and the camera properties).

The capturing of the images is controlled so that successively captured images would cover at least partly a common sub-region of the terrain (if the vehicle moves linearly without unexpected influences) in order to provide identical points in the terrain in each of the successive images. In that context, a frequency of capturing the images is adaptable depending on the movement of the gardening vehicle, in particular depending on the moving speed and the changes of orientation of the gardening vehicle while moving.

A method of simultaneous localisation and mapping (SLAM) is applied (step 33) to the captured images in order to derive terrain information. As described above, such SLAM provides both the possibility of localising the gardening vehicle in the terrain and the possibility of (simultaneously) mapping the terrain, particularly by generating a point cloud (e.g. on basis of stereo-photogrammetry provided by the movement of the vehicle) or map or model of the covered terrain and determining the position of the gardening vehicle in that terrain (in the point cloud).

A possible approach for realising such SLAM is based on the following principle. The gardening vehicle is placed at an arbitrary position in the environment (step 31), that arbitrary position defines an origin of a coordinate system and thus the first (origin) position of the vehicle in that coordinate system is known. Starting at that first known position, the gardening vehicle is moving in the terrain and capturing images of the terrain (step 32). A first image covers a first terrain section, a second image still covers a part of the first terrain section and an additional region of the terrain together representing a second terrain section and a next image covers a part of the second terrain section and a further additional terrain region (and so on).

By means of the captured (overlapping) images a tracking of the movement of the vehicle is provided by processing the captured images and particularly identifying common positions in the terrain on at least two images, i.e. respective positions of the vehicle are determinable (step 34). Moreover, a map of the terrain (e.g. in form of one big point cloud) is creatable by processing the images so that one cohesive (i.e. continuous) point cloud based on the plurality of captured images is processable (step 35) on basis of identified identical points in the images. Particularly, stereoscopic bases for calculating the point clouds (based on e.g. two successive images) may be provided by the movement of the gardening vehicle and the image capturing frequency.

Thus, the SLAM process is configured to incrementally generate a map (point cloud) of the terrain and continuously determining current positions of the gardening vehicle while moving.

The map and the position in the terrain are derived based on above process. However, such process does not provide a scaled map or a measure of relative positions in the terrain as for instance a distance between two positions. The map is based on image data only, wherein the determined positions of the gardening vehicle are derived from the image data as well. The image data does not provide any information about distances in the terrain. Thus, an entire map of the terrain to be treated may be derived, whereby that map initially represents the whole terrain but in an un-scaled manner, i.e. distances between single points of the point cloud are unknown.

According to the invention, a respective scaling of the point cloud (and particularly of the position data for the gardening vehicle) is performed by applying absolute scale information (e.g. a measure for distances) to the terrain data (step 36). The absolute scale information is derivable by several methods as described in context of FIGS. 1-3. According to these methods, an absolute measure can be derived e.g. by measuring the rotation of a wheel of the gardening vehicle (wherein the diameter of the wheel is known), by continuously measuring distances to an object in the terrain and determining the changes of distance to that object by a distance measuring unit or RIM-camera and/or by capturing and processing images of defined markers in the terrain.

As a result of the scaling step 36 scaled terrain data 34a, 35a (point cloud and position information) is provided.

Such scaled data allows generating a map of the terrain with a precise measure and to exactly determine and provide a current position of the gardening vehicle. Additionally, the scaled terrain data enables to improve planning of movement of the gardening vehicle in the terrain for more efficiently covering the entire terrain area, i.e. reducing the distance travelled by the gardening vehicle until each terrain section was reached and treated or planning travelled distances in dependency of a state of charge of the battery of the gardening vehicle.

Above described methods for gathering information with a gardening vehicle and/or navigation of a gardening vehicle are analogously applicable by an autonomously working vacuum cleaner known from the prior art.

What is claimed is:

1. A method for generating scaled terrain information with an unmanned autonomous gardening vehicle, the gardening vehicle comprising
   a driving unit comprising
      a set of at least one drive wheel, and
      a motor connected to the at least one drive wheel for providing movability of the gardening vehicle;
   a gardening-tool; and
   a camera for capturing images of a terrain, the camera being positioned and aligned in known manner relative to the gardening vehicle;
   wherein the method comprises:
      moving the gardening vehicle in the terrain whilst concurrently generating a set of image data by capturing an image series of terrain sections so that at least two images of the image series cover an amount of identical points in the terrain, wherein the terrain sections are defined by a viewing area of the camera at respective positions of the camera while moving;
      applying a simultaneous localization and mapping (SLAM) algorithm to the set of image data and thereby deriving terrain data, the terrain data comprising:
         a three-dimensional point cloud representing the captured terrain, and
         position data relating to a relative position of the gardening vehicle in the terrain; and
      scaling the three-dimensional point cloud by applying an absolute scale information to the terrain data,
      wherein the absolute scale information is derived by
      capturing a reference image of a reference body, of which at least one of the appearance and the position in the terrain is known, and
      deriving the absolute scale information by image processing based on the appearance of the reference body in the captured reference image and of a known magnification ratio of the camera,
      wherein at least one of the dimensions, spatial orientation, and shape of the reference body is pre-known.

2. The method according to claim 1, wherein the scaling of the point cloud comprises scaling the position data.

3. The method according to claim 1, wherein the at least two images comprise at least two successive images.

4. The method according to claim 1, wherein the unmanned autonomous gardening vehicle is implemented as an unmanned autonomous lawnmower, wherein the gardening-tool is implemented as a cutting-tool.

5. The method according to claim 1, wherein the absolute scale information is derived by receiving movement data from a sensor unit of the gardening vehicle providing information about a distance covered by moving the gardening vehicle, the sensor unit being designed as at least one of
   a sensor for detecting revolutions of a wheel of the gardening vehicle;
   a distance measuring unit for measuring distances to an object by emitting laser light and receiving the laser light reflected at the object;
   a range camera; and
   an inertial measuring unit (IMU).

6. The method according to claim 5, wherein the wheel is one of the at least one drive wheel.

7. The method according to claim 1, wherein:
   transmitting at least one of the set of image data and the terrain data to a database and
   storing the data in the database, wherein at least one of:
      the gardening vehicle comprises a storing unit comprising the database,
      a remote controlling unit for controlling the gardening vehicle comprises the storing unit comprising the database, and
      the database is embodied by a data cloud stored on a remote server, wherein the terrain data is derived from the image data by cloud computing based on the simultaneous localization and mapping (SLAM) algorithm and/or the scaling of the point cloud is performed by cloud computing.

8. The method according to claim 1, wherein a borderline of a working area for the gardening vehicle, within which the gardening vehicle is controllable to autonomously move and work, is defined by at least one of:
   teaching the borderline by at least one of:
      moving the gardening vehicle along a desired path, capturing a series of border-images of terrain corresponding to the path and of a defined vicinity relative to the path, the series of border-images represents the image series, and providing the series of border-images for controlling the gardening vehicle, and setting the borderline on basis of a terrain map, wherein border-position data is provided for controlling the gardening vehicle.

9. The method according to claim 8, wherein in case the borderline is defined by teaching, continuously comparing the border-images of the series of border-images with actual images by image processing, the actual images being captured while moving the gardening vehicle inside the working area, deriving a rate of matching for every actual image based on the comparison and controlling the movement of the gardening vehicle based on the rate of matching so that the gardening vehicle automatically moves only inside the working area, providing a movement-controlling command for adapting the movement direction of the gardening vehicle if the rate of matching exceeds a predetermined matching-threshold.

10. The method according to claim 1, further comprising:
extracting at least one state parameter from at least one of the set of image data and the terrain data which represents an actual state of at least one designated terrain section, the actual state relating to a state of at least one plant and ground, comparing the at least one state parameter to a predetermined threshold for a respective state and deriving gardener information based on the comparison of the predetermined threshold and the at least one state parameter.

11. The method according to claim 10, wherein the at least one state parameter provides at least one terrain factor of a group of terrain factors, the group of terrain factors comprising at least one of:

plant height,
plant growth,
humidity of the terrain,
density of plants,
planarity of the terrain and
brightness or colour of the terrain.

12. The method according to claim 10, wherein at least one of:

the gardener information is provided to a user of the gardening vehicle together with a related recommendation concerning a suggested treatment of the respective at least one designated terrain section, and the gardening-tool is applied based on the gardener information.

13. The method according to claim 12, wherein the gardening tool comprises at least one of a hedge-cutter, a tree-branch cutter, a grass-cutter, scissors, a fertilising unit, a pesticide unit, a watering unit, and a lawn thatcher.

14. The method according to claim 1, further comprising:
applying the gardening-tool based on the terrain data, in particular based on the point cloud, wherein the terrain data represents at least an actual shape of an object in the captured terrain, gardening data is provided representing a target shape for the object and the gardening-tool is guided based on the gardening data so that the actual shape of the object is transferred into the target shape, wherein the gardening vehicle is positioned at a designated position in the terrain based on the terrain data and the gardening-tool is guided according to a designated shape of a plant based on the terrain data and the gardening data.

15. The method according to claim 1, further comprising at least one of:

providing controlling information for controlling a further gardening unit in the terrain, wherein the controlling information is derived by the terrain data and an actual position and orientation of the further gardening unit in the terrain, wherein the position and orientation of the gardening unit is derived from the terrain data by data processing or by image processing of an image covering at least a part of the gardening unit and a part of the terrain, in particular wherein the gardening unit comprises a 6DoF-target providing the determination of the orientation of the gardening unit with six degrees of freedom by image processing, and creating a digital terrain map based on the point cloud.

16. An unmanned autonomous gardening vehicle comprising a driving unit comprising:
a set of at least one drive wheel, and
a motor connected to the at least one drive wheel for providing movability of the gardening vehicle;

a gardening-tool;

a camera for capturing images of a terrain, the camera being positioned and aligned in known manner relative to the gardening vehicle; and a controlling unit for controlling the gardening vehicle, wherein the gardening vehicle providing a functionality adapted to generate scaled terrain information by performing the following:

moving the gardening vehicle in the terrain whilst concurrently generating a set of image data by capturing an image series of terrain sections so that at least two images of the image series cover an amount of identical points in the terrain, wherein the terrain sections are defined by a viewing area of the camera at respective positions of the camera while moving, applying a simultaneous localization and mapping (SLAM) algorithm to the set of image data and thereby deriving terrain data, the terrain data comprising:

a point cloud representing the captured terrain and position data relating to a relative position of the gardening vehicle in the terrain, and scaling the point cloud by applying an absolute scale information to the terrain data, wherein the absolute scale information is derived by capturing a reference image of a reference body, of which at least one of the appearance and the position in the terrain is known, and deriving the absolute scale information by image processing based on the appearance of the reference body in the captured reference image and of a known magnification ratio of the camera, wherein at least one of the dimensions, spatial orientation, and shape of the reference body is pre-known.

17. The unmanned autonomous gardening vehicle according to claim 16, wherein the unmanned autonomous gardening vehicle is implemented as an unmanned autonomous lawnmower, wherein the gardening-tool is implemented as a cutting-tool.

18. The unmanned autonomous gardening vehicle according to claim 16, wherein the gardening vehicle comprises at least one of:

a counting sensor counting the number of revolutions of a wheel of the gardening vehicle, the counting sensor providing the absolute scale information;

a distance measuring unit for measuring distances to an object by emitting laser light and receiving the laser light reflected at the object;

a range camera; and at least one swivel for swivelling the camera so that the camera is alignable in a desired direction for capturing the terrain sections or a reference body which provides the absolute scale information.

19. A non-transitory computer program product having computer-executable instructions for controlling and executing the method comprising:

moving the gardening vehicle in the terrain whilst concurrently generating a set of image data by capturing an image series of terrain sections so that at least two images of the image series cover an amount of identical points in the terrain, wherein the terrain sections are defined by a viewing area of the camera at respective positions of the camera while moving;

applying a simultaneous localization and mapping (SLAM) algorithm to the set of image data and thereby deriving terrain data, the terrain data comprising:

a point cloud representing the captured terrain, and position data relating to a relative position of the gardening vehicle in the terrain; and scaling the point cloud by applying an absolute scale information to the terrain data, wherein the absolute scale information is derived by capturing a reference image of a reference body, of which at least one of the appearance and the position in the terrain is known, and deriving the absolute scale information by image processing based on the appearance of the reference body in the captured reference image and of a known magnification ratio of the camera, wherein at least one of the dimensions, spatial orientation, and shape of the reference body is pre-known.

* * * * *